(12) United States Patent
Thorsbakken (10) Patent No.: US 7,607,862 B2
(45) Date of Patent: Oct. 27, 2009

(54) SHOALING WATER ENERGY CONVERSION DEVICE

(76) Inventor: Arden L. Thorsbakken, 4304 Tamara Dr., Eau Claire, WI (US) 54701

( * ) Notice: Subject to any disclaimer, the term of this patent is extended or adjusted under 35 U.S.C. 154(b) by 298 days.

(21) Appl. No.: 11/357,331

(22) Filed: Feb. 17, 2006

(65) Prior Publication Data

US 2007/0048086 A1    Mar. 1, 2007

Related U.S. Application Data

(60) Provisional application No. 60/725,255, filed on Oct. 11, 2005, provisional application No. 60/713,783, filed on Aug. 29, 2005.

(51) Int. Cl.
*F03B 13/18* (2006.01)
(52) U.S. Cl. ............... 405/76; 60/497; 290/53
(58) Field of Classification Search ......... 417/230–233; 290/53; 405/76, 77; 60/497–499, 501, 502
See application file for complete search history.

(56) References Cited

U.S. PATENT DOCUMENTS

| 430,790 | A | * | 6/1890 | Starkenberg | ................. | 405/76 |
|---|---|---|---|---|---|---|
| 630,006 | A | * | 8/1899 | Rogowski | ................... | 405/77 |
| 858,486 | A | * | 7/1907 | Todd | ............................ | 405/77 |
| 1,476,229 | A | * | 12/1923 | Suess | ........................ | 60/696 |
| 2,093,351 | A | | 9/1937 | David | | |
| 3,983,404 | A | * | 9/1976 | Sherrard | ..................... | 290/53 |
| 4,170,428 | A | * | 10/1979 | Atencio | ....................... | 405/78 |
| 4,172,689 | A | * | 10/1979 | Thorsheim | .................... | 415/7 |
| 4,232,230 | A | | 11/1980 | Ames | | |
| 4,263,516 | A | * | 4/1981 | Papadakis | .................... | 290/53 |
| 4,266,143 | A | | 5/1981 | Ng | | |
| 4,282,443 | A | | 8/1981 | Seidl | | |
| 4,289,455 | A | | 9/1981 | Comyns et al. | | |
| 4,317,047 | A | | 2/1982 | de Almada | | |
| 4,340,821 | A | | 7/1982 | Slonim | | |
| 4,352,023 | A | | 9/1982 | Sachs et al. | | |
| 4,363,564 | A | | 12/1982 | Borgren | | |
| 4,379,235 | A | | 4/1983 | Trepl, II | | |
| 4,384,456 | A | | 5/1983 | Boros | | |
| 4,389,843 | A | | 6/1983 | Lamberti | | |
| 4,392,349 | A | | 7/1983 | Hagen | | |
| 4,408,454 | A | | 10/1983 | Hagen et al. | | |
| 4,423,334 | A | | 12/1983 | Jacobi et al. | | |
| 4,438,343 | A | | 3/1984 | Marken | | |
| 4,443,708 | A | | 4/1984 | Lapeyre | | |

(Continued)

*Primary Examiner*—Tara Mayo-Pinnock
(74) *Attorney, Agent, or Firm*—Skinner & Associates (57) ABSTRACT

A device for converting the energy of water waves or flowing water into electrical or mechanical energy. The device includes a body or collection chamber with a hydro-turbine located opposite the water entrance and, preferably, a water clear out channel flange located beneath the hydro-turbine and at or upstream of the water exhaust from the device. As the water is channeled by wave facing directional blades and a wave leveler through and exits the hydro-turbine or pump, it has free exit into a water void area which is produced by the deep water, with its own flotation apparatus or moorings, or near shore, held by supports secured to the seabed or other structures. The device also exhibits a "tip up, tip down" synchronous motion as wave fronts advance through and passed the device, which increases the efficiency of the device by accelerating the flow of water therethrough.

19 Claims, 6 Drawing Sheets

U.S. PATENT DOCUMENTS

| | | |
|---|---|---|
| 4,447,740 A | 5/1984 | Heck |
| 4,448,020 A | 5/1984 | Wood et al. |
| 4,463,555 A * | 8/1984 | Wilcoxson .................. 60/325 |
| 4,466,244 A | 8/1984 | Wu |
| 4,467,217 A | 8/1984 | Roussey |
| 4,492,875 A | 1/1985 | Rowe |
| 4,531,063 A | 7/1985 | Vielmo et al. |
| 4,533,292 A | 8/1985 | Sugihara et al. |
| 4,539,485 A | 9/1985 | Neuenschwander |
| 4,546,264 A | 10/1985 | Pinson |
| 4,552,514 A | 11/1985 | Hagen |
| 4,563,591 A | 1/1986 | Jones |
| 4,564,312 A | 1/1986 | Munoz Saiz |
| 4,599,041 A | 7/1986 | Stricker |
| 4,603,551 A | 8/1986 | Wood |
| 4,622,473 A | 11/1986 | Curry |
| 4,672,322 A | 6/1987 | Gratteau et al. |
| 4,684,815 A | 8/1987 | Gargos |
| 4,719,158 A | 1/1988 | Salomon |
| 4,748,338 A | 5/1988 | Boyce |
| 4,754,157 A | 6/1988 | Windle |
| 4,756,267 A | 7/1988 | Carr et al. |
| 4,781,023 A | 11/1988 | Gordon |
| 4,803,839 A | 2/1989 | Russo, III |
| 4,843,250 A | 6/1989 | Stupakis |
| 4,850,190 A | 7/1989 | Pitts |
| 4,851,704 A | 7/1989 | Rubi |
| 4,914,915 A | 4/1990 | Linderfelt |
| 5,009,568 A | 4/1991 | Bell |
| 5,048,356 A | 9/1991 | Levko |
| 5,150,744 A | 9/1992 | Hayashi et al. |
| 5,167,786 A | 12/1992 | Eberle |
| 5,184,915 A | 2/1993 | Marino |
| 5,405,250 A * | 4/1995 | Vowles et al. ............... 417/331 |
| 5,440,175 A * | 8/1995 | Mayo et al. .................. 290/54 |
| 5,443,361 A | 8/1995 | Skaarup |
| 5,461,862 A | 10/1995 | Ovadia |
| 5,789,826 A | 8/1998 | Kumbatovic |
| 5,808,368 A | 9/1998 | Brown |
| 5,947,678 A | 9/1999 | Bergstein |
| 6,020,653 A | 2/2000 | Woodbridge et al. |
| 6,045,339 A | 4/2000 | Berg |
| 6,109,029 A | 8/2000 | Vowles et al. |
| 6,273,680 B1 | 8/2001 | Arnold |
| 6,360,534 B1 | 3/2002 | Denniss |
| 6,389,810 B1 | 5/2002 | Nakomcic |
| 6,527,504 B1 | 3/2003 | Skaarup |
| 6,622,483 B2 | 9/2003 | Denniss |
| 6,755,607 B1 * | 6/2004 | Hester et al. ................. 415/3.1 |
| 6,756,695 B2 | 6/2004 | Hibbs et al. |
| 6,791,206 B1 | 9/2004 | Woodbridge |
| 6,877,968 B2 * | 4/2005 | Godsall et al. ............. 418/268 |

* cited by examiner

SHOALING WATER ENERGY CONVERSION DEVICE

CROSS-REFERENCE TO RELATED APPLICATION

This application is based upon and claims the benefit of U.S. Provisional Application Ser. No. 60/713,783, filed Aug. 29, 2005, and U.S. Provisional Application Ser. No. 60/725,255, filed Oct. 11, 2005.

BACKGROUND OF THE INVENTION

The present invention is directed to a shoaling water energy conversion device and, more particularly, to a shoaling water energy conversion device for use in oceans, lakes, rivers, and other bodies of water.

The general idea of harnessing the power of waves in an ocean or a lake, or the current of a river, to produce energy has been around for many centuries. Water wheels were used to irrigate farmland and to process the crops grown thereon since antiquity. The various devices developed met with differing levels of success, but, until recently, the devices were generally used as a direct source of power. That is, the devices usually converted the power of the waves or current directly into mechanical energy, such as, for example, turning a mill for processing grain. More recent devices, those from the last century or two, have shifted to the production of electrical energy, rather than mechanical energy, which can be used to indirectly power devices located off-site. Since these recent devices convert the kinetic energy of the waves or current into electrical energy, these devices are generally known as water energy conversion devices.

The purpose of a water energy conversion device is to harvest the energy in moving water or waves. Since wave energy and energy from flowing water are renewable resources, the environmental impact is limited to the resources used for the production, installation, and dismantling of the device itself.

A great number of energy conversion systems have been proposed. Traditionally, water energy conversion devices have been classified by their placement (on shore, near shore, or off shore/deep water), rather than by the principle of operation of the device or how much energy the device can effectively produce. A conventional water energy conversion device may be placed in a great number of locations, but has been most widely used in oceans and inland riverways that are subject to greater, and more consistent, wave action or current. A conventional wave energy conversion system may be located near shore, on land near the coast, or away from the shore in deeper water and may be of a floating or submerged type. More recently, such devices have begun to be classified by their general method of producing power.

The first category of energy conversion systems includes "moving" systems, where the moving water or wave is used to move a body to produce energy. The body may in the form of an oscillating water column, a float, a roller, connected floats, a flexible body (such as a hinged plate), a fixed body (such as an airbag), and may other forms.

Most water energy conversion devices of the "moving" type are of an "up and down" type, most of which use a float. In these devices the "up and down" movement of the float as a wave passes the device is used to create a pushing/pulling force in relation to a fixed point. This fixed point can be an anchor, dampening plate, or other support apparatus. These devices use only the potential energy of the wave (i.e. the height difference between the crest and the trough of the wave) and the energy produced can never be greater than the potential energy component of the wave. The floats of these devices also often have size limitations that are dependent upon the size of the waves, since the "rolling" of the float in the wave or the riding of the float over the troughs of the waves (i.e. stretching between two wave crests) reduces the efficiency of the device. Examples of these "up and down" type devices include: the McCabe Wave Pump, which consists of three rectangular pontoons that move relative to each other as waves pass by, thereby producing energy through the movement of the pontoons; the Danish Wave Power float-pump device which uses a float that is attached to a seabed-mounted piston pump to produce energy; U.S. Pat. No. 2,093,351 to David, which discloses a float that generates electrical power through the vertical movement of the float due to wave action and the weight of the float; and U.S. Pat. No. 4,232,230 to Ames, which discloses that use of floats to activate electrical generating units supported by a base plate as the device is "rocked" by waves; and U.S. Pat. No. 4,672,222 to Ames, which discloses an apparatus with floats that utilize the vertical motion of waves to activate electrical generators located on a base or damper plate.

"Moving" type water energy conversion device may also utilize an oscillating water column to produce energy. In these devices, water, air or fluid oscillates up and down in a fixed pipe. The pressure variation of the water surface underneath the pipe forces the air above the surface of the water in the pipe to oscillate. This oscillating airflow, in turn, may be passed through a turbine and be used to produce energy. The length of the pipe is subject to size limitations, as the efficiency of the device drops if the pipe is too large relative to the size of the waves. Examples of these oscillating water colunm type devices include: the OSPREY (Ocean Swell Powered Renewable Energy) buoy, which produces energy using an oscillating water column; and the TAPCHAN (tapered channel system), which includes a gradually narrowing channel with high walls and wave deflectors that capture waves to compress air, which then drives an axial flow Wells turbine; and U.S. Pat. No. 6,360,534 to Denniss and U.S. Pat. No. 6,622,483 to Denniss, which disclose an apparatus that uses an oscillating wave surface to produce an oscillating air column that drives a turbine located at the outlet of the air chamber.

"Moving" type energy conversion systems may also utilize a roller, which can extract both kinetic and potential energy from the waves. The limitations on the energy extraction of these devices are largely dependent upon the necessity of matching the design of the device to the type and size of the waves that will be encountered. Although these devices can all extract energy from the waves, they rely on oscillating with exactly the optimal phase and amplitude in relation to the incoming waves. As such, these devices are less effective in areas where the wavelength and size of waves is variable. Most of the energy lost during the operation of roller type devices is due to friction between the water and the surface of the device.

The final type of "moving" type energy conversion systems is an impact-type device. These devices are generally constructed to use a very specific type and size of wave. Most of these devices use some type of airbag which is compressed by the impact of a wave and then allowed to return to its original position between wave fronts. Generally, when the airbag is compressed, it forces air through a turbine due to a difference in pressure, which then equalizes as the wave passes, causing the airbag to return to its original position. This oscillation of the air through the turbine produces energy. These devices may extract both kinetic and potential energy from the waves, but energy is often lost due to the uneven pulsating character of the energy delivery, regardless of whether a firm or flexible body is used. Examples of these impact type devices include: U.S. Pat. No. 4,384,456 to Boros, which describes an apparatus that serves as a breakwater and produces electrical energy through the movement of baffles through wave action; U.S. Pat. No. 4,448,020 to Wood, which discloses an apparatus that converts wave energy to electrical power by directing the flow of air or hydraulic fluid displaced by the cyclic application of wave force through a generator; and U.S. Pat. No. 4,552,514 to Hagen, which shows an apparatus that produces power when wave action causes a float to compress air, gas, or liquid in a piston and wherein the air, gas, or liquid is forced to flow through a generator.

A second category of wave energy conversion systems includes "shoaling" type systems, where the movement of the water or waves causes water to be flushed into the device. Most shoaling type energy conversion systems use ramps or slanted plates to elevate flowing or moving water to allow it to fall into or through hydro-turbines to produce energy. The limitations of these devices often depend upon the particular design. A "wash up" device converts some of the kinetic energy or the wave to potential energy by making the wave shoal over and run up an inclined plate and into a reservoir. As the water flows out of, or into, the reservoir it may be run through a turbine to produce energy. A "flush in" device makes the waves flush into the device, causing a turbine to turn and produce power. Both "wash up" and "flush in" devices will lose energy due to friction as the waves shoal up into and over the device. Examples of these "breaking" type devices include a floating wave power vessel, which consists of a steel platform having a sloping ramp that directs incoming waves into a raised basin, which then drains through a hydro-turbine generator to product energy; U.S. Pat. No. 5,443,361 to Skaarup, which shows a method of elevating flowing water or waves via a ramp wherein the elevated water is directed into an energy conversion engine; and the Wave-Plane made by WavePlane Production A/S, which elevates flowing water or waves via a ramp wherein the elevated water is directed into an energy conversion engine.

Other examples of conventional wave energy conversion systems having various designs may be found in other United States patents. U.S. Pat. No. 4,363,564 to Borgen describes a method and apparatus for directing energy from waves or flowing water into and through a generator to produce electrical power. U.S. Pat. No. 4,756,267 to Carr discloses a tubular mooring line with reinforced elastomeric material that may be combined with a turbine to form an electric power system. U.S. Pat. No. 6,527,504 to Skaarup describes a device that converts wave action into a whirling motion in water which is utilized to turn a turbine. U.S. Pat. No. 6,885,114 to Baarman describes a hydro-turbine unit confined within a housing wherein the plurality of paddles turn to produce electrical power in response to fluid that his force through a nozzle and directed at the paddles.

In general, wave energy conversion systems that are located offshore in deep water have the advantage of having larger waves from which to produce energy, with the disadvantage of requiring longer and more expensive underwater cables to transmit the energy to shore and more difficultly in performing maintenance on the system. On the other hand, onshore or near-shore units have the advantage of easier maintenance and installation, a shorter length of underwater cable needed to transmit the energy to shore, and not requiring deep-water moorings, but have the disadvantages of having smaller waves from which to product energy and, in some cases, meeting resistance from nearby residents due to its aesthetic effects on the shoreline.

While conventional wave energy conversion systems have been successfully developed and utilized, they are not without problems. In particular, conventional wave energy conversion systems often operate at a lower efficiency than may be desirable due to the energy loss from the wave caused by the wave's interaction with the device itself (for example, the loss of energy through the shoaling of the wave on the device and the back-pressure effect which occurs when the water is unable to properly be "cleared-out" from the exit of the device). Likewise, conventional shoaling water energy conversion devices have been limited to one method or type of energy conversion, thereby reducing the amount of energy produced by the systems.

The present invention addresses the some of the problems of these conventional wave energy conversion systems and provides an inexpensive energy conversion system that is able to operate at greater efficiency. More particularly, the present invention directs the flow of water into a hydro-turbine or pump which is uniquely efficient due to a "water foil" or "splash-away" plate located under the device which allows the free expulsion or exit of water from the exhaust of the turbine or pump. Additionally, the present invention allows the weight of the wave, from its crest to near its trough, and the kinetic energy of the lateral movement of the wave to be captured without the energy loss associated with lifting the wave. The present invention also includes forward collection plates or boards and may include a wave leveler or modifier that flattens the wave and directs the flow of the wave water into the unit, thereby increasing the fluid velocity through the device while, at the same time, adding lift to the portion of the device facing the incoming wave.

BRIEF SUMMARY OF THE INVENTION

The present invention includes a shoaling water energy conversion device capable of producing electrical or mechanical energy from the motion of waves or moving water. A device having features of the present invention includes a body or collection chamber that surrounds a hydro-turbine that is activated by the flow of water through the device as a wave front passes by or as water flows into the device. The water is confined and directed into the hydro-turbine by the body, which may include lateral wings that face the incoming waves and/or a wave leveler (a catch plate, blade or attachment that flattens incoming waves and directs the flow of the waves into the unit), thereby increasing both the volume and velocity of the flow through the device.

The present invention preferably includes an apparatus with a water foil or clear out channel flange which keeps the exit or exhaust of the device free of water, such that water that has flowed through the device may exit freely from the device without interference from back pressure produced by exterior water that flowed under the device. The use of this water foil or clear out channel flange allows the device to be used directly within the wave front. The "water foil" or "splash out" plate that keeps the exit from the body clear of water is located on the underside of the device, at or near the posterior end of the body. The water foil or splash out plate enhances the efficiency of the device by giving the water flowing through the device free exit therefrom into a void area in the surrounding water, without interference from the back pressure caused by water adjacent to the exit. Alternatively, the water foil or clear out channel flange may be omitted and the water flowing through the device may exit into a smaller void area created by the body of the device itself. While the void area created by the device itself absent the water foil or clear out channel may be smaller than that created by utilizing the clear out channel flange, in some circumstances it may be sufficient to allow free exit from the device without interference from the back pressure caused by water adjacent to the exit.

The front edge of the body or collection chamber faces the incoming waves and is designed to penetrate an incoming wave above the trough of the wave, such that a significant portion of the wave breaks and overtops the lower edge of the body and rushes through the device. The body or collection chamber directs the water through the hydro-turbine as it flows through the device, thereby producing energy.

As the wave begins to pass the shoaling water energy conversion device, the residual portion of the wave raises the anterior end of the device, while the posterior end of the device, which is entering the trough and which is heavier due to the flowing water within the device, is lower than the anterior end and remains in this lower position until the residual portion of the wave passes underneath the unit, thereby causing the unit to "rock." This height difference between the anterior and posterior ends of the device accelerates the water flowing through the device, enhancing the production of energy by the turbine.

The present invention also provides a shoaling water energy conversion device that has greater efficiency than conventional devices, as the present invention may be used directly in the wave front without the loss of shoaling energy through the use of an artificial ramp or other structure to raise the water above the wave front. As such, the shoaling water energy conversion device may produce greater electrical energy from the height, weight, and kinetic energy of the wave. Additionally, the device may be used in flowing water, such as in rivers or streams, where an artificial ramp or similar structure would be inoperable.

The present invention also includes a device capable of using a "tip up, tip down" movement to accelerates the water flow through the device, thus increasing the efficiency of the device. This "tip up, tip down" movement is due to the use of a float fulcrum or the use of a support fulcrum mounted on a supporting framework, which itself may have floatation devices. Alternatively, the device may exhibit this "tip up, tip down" movement due to the position of a ocean bottom or riverbed tether. The device may also include a hydraulic pump for pumping water or fluid, or generating additional electrical energy, that is activated and operated by this "tip up, tip down" movement of the device caused by waves passing by the device and the weight of the water flowing therethrough.

The present invention may be used in conjunction with various conventional support apparatuses or methods of anchoring the shoaling water energy conversion device in a chosen location and may also be used in both near shore and deep sea locations. When located in near shore or deep water locations, the device may optionally include adjustable pods or ballast tanks that may be programmed to adjust the location of the device on a support apparatus according to the height and period of incoming waves, or to protect the device from damage from storms and wave surges, such as by enabling the temporary complete submersion of the unit during storms. The present invention may also be used in near shore locations and such use has the added benefit of reduced erosion due to the breakwater effect of the device, particularly when an array of devices is utilized.

Finally, the present invention is economical to produce and use. The device may be produced from inexpensive components and may be produced in such a way as to limit the expense of onsite maintenance.

DETAILED DESCRIPTION OF THE PREFERRED EMBODIMENT(S)

Referring to FIGS. 1-6, a shoaling water energy conversion device 10 having features of the present invention is shown. The shoaling water energy conversion device 10 includes a body or collection chamber 12, a hydro-turbine 14, and, preferably, a water foil or clear out channel flange 16. The shoaling water energy conversion device 10 also preferably includes a wave leveler or catch plate 18 and anterior lateral wave confinement blades 20.

Figure 1:
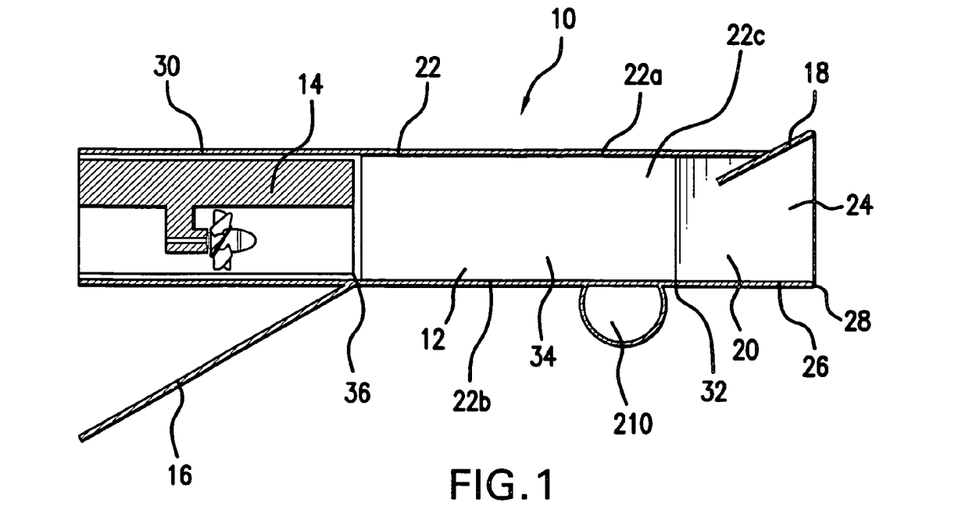
FIG. 1 is a sectional view of a shoaling water energy conversion device embodying features of the present invention as viewed along line 1-1 of FIG. 4.
Figure 2:
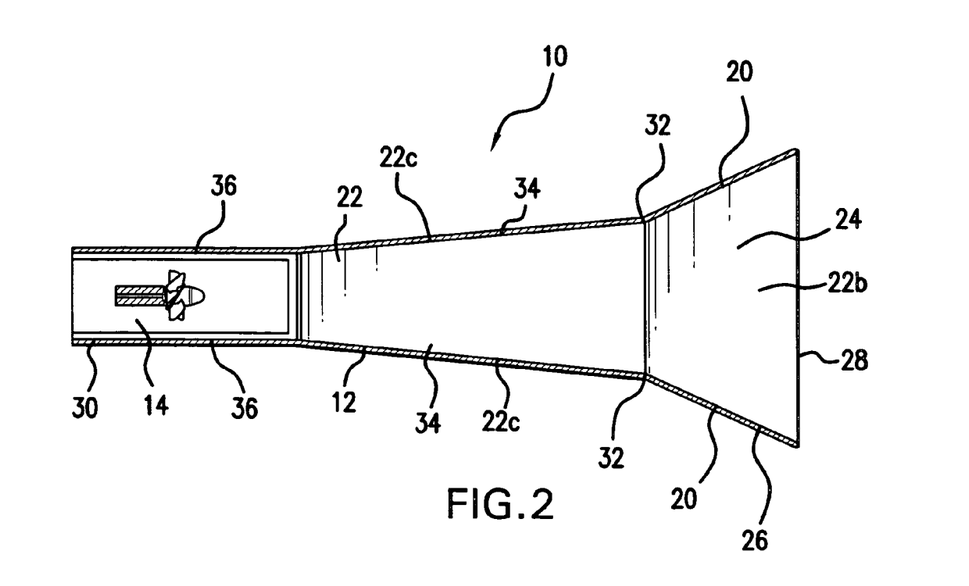
FIG. 2 is a sectional view of the shoaling water energy conversion device of FIG. 1 as viewed along line 2-2 of FIG. 3.

The body 12 preferably includes walls 22 that surround a central channel 24. The walls 22 include a top wall 22*a,* a bottom wall 22*b* and two side walls 22*c*. Alternatively, the body 12 may only three walls, generally in the form of a bottom wall and two side walls. The body 12 has an anterior end 26 and a posterior end 30.

The body 12 has buoyancy that is sufficient to keep the shoaling water energy conversion device 10 from fully submerging in the water and to allow the shoaling water energy conversion device 10 to rotate relative to the support to which the device 10 is attached as waves pass by and through the device 10. The body 12 may be constructed of any material that exhibits buoyancy, either naturally or when formed into a structure containing sufficient air to allow the material to float, such as plastic, aluminum, stainless steel, or dense foam. Preferably, the material from which the body 12 is constructed is resistant to corrosion, particularly when the device 10 is intended for use in salt water.

Preferably, the body 12 is made from a lightweight, buoyant material, such that the body 12 provides sufficient buoyancy without the need for additional floats, ballast tanks, or other similar components. However, the body 12 may alternatively include additional floats, ballast tanks, or other similar components that are either integral to or attached to the body 12 in order to increase the buoyancy of the shoaling water energy conversion device 10. When such alternative floats, ballast tanks, or other similar components are utilized, they may be enclosed between the side walls 22c of the shoaling water energy conversion device 10 (or if desired the any of the other walls 22 of the device) and optional outer walls in order to protect the components.

The buoyancy of the body 12 is selected such that a leading edge 28 of the bottom wall 22b of the body 12 penetrates an incoming wave above the trough of the wave, such that a significant portion of the wave breaks and overtops the bottom wall 22b of the body 12 and flows through the shoaling water energy conversion device 10. However, the leading edge 28 of the bottom wall 22b penetrates an incoming wave a distance above the trough of the wave that is sufficient to prevent the crest of the wave from overtopping and fully submerging the device 10 as it passes by.

Optionally, where additional floats, ballast tanks, or other similar components are utilized and, more particularly, where ballast tanks are utilized, the shoaling water energy conversion device 10 may include manual or automated controls for adjusting the buoyancy of the shoaling water energy conversion device 10 as necessary. That is, the shoaling water energy conversion device 10 may be self leveling or self-adjusting, such that the device 10 may adjust to changing wave types and sizes or current flows by controlling the amount of ballast within the ballast tank. These controls may be manual in nature, such that a user of the shoaling water energy conversion device manually fills or empties the ballast tanks, or may be automated, such that the filling or emptying of the ballast tanks is activated by pressure, environmental measurements, or via computer program control.

While the body 12 is discussed herein is preferably of a fixed length, the body 12 may alternatively be capable of having an adjustable length. For example, the body may be in the form of a telescoping body, such that the length of the body 12 may be adjusted according to the type, size, and frequency of the waves or flowing water in which the shoaling water energy conversion device 10 will be used. However, any type of construction for the body 12 that allows the length of the body to be adjusted may be used in place of the telescoping body.

Preferably, as best seen in FIG. 2, the channel 24 is larger in size at the anterior end 26 of the body 12, such that the shoaling water energy conversion device 10 may capture a greater amount of a wave as it passes, and the channel 24 is smaller in size at the location of the hydro-turbine 14 and at the posterior end 30, such that a substantial portion of the captured wave is forced to pass through the hydro-turbine 14. Preferably, the anterior portion of the side walls 22c are angled, with the anterior edges 32 of the side walls 22c being further apart than the side walls 22c are at the entrance of the hydro-turbine 14. That is, the side walls 22c generally include angled portions 34, which are located ahead of the hydro-turbine 14 and which angle outward as they near the anterior end 30 of the body 12, and straight portions 36 that are located adjacent the hydro-turbine 14 and which surround the hydro-turbine 14.

Optionally, the size of the channel 24 at the anterior end 26 of the body 12 may be further increased by including the lateral wave confinement blades 20. The lateral wave confinement blades 20 are generally attached to, or integral to, the side walls 22c of the body 12 and extend from the anterior edges 32 of the side walls 22c. The lateral wave confinement blades 20 are straight, curved or angled portions that direct water into the device 10.

Preferably, the lateral wave confinement blades 20 are angled, such that the size of the channel 24 gradually increases as it becomes closer to the anterior end 26 of the body 12 and the entrance of the channel 24. The angle at which the lateral wave confinement blades 20 meet the side walls 22c may be any angle less than ninety (90) degrees and may be selected according to the size of the waves, or the variation in size of the waves, which the device 10 is intended to capture. The lateral wave confinement blades 20 may alternatively have a curved configuration, as such a design may reduce the friction to which water flowing through the shoaling water energy conversion device 10 is subjected to and also allows the water to flow smoothly through the device 10.

As shown in FIG. 1, the top wall 22a of the body 12 of the shoaling water energy conversion device 10 may optionally include the wave leveler 18. The wave leveler 18 is a catch plate, blade or attachment that flattens incoming waves and directs the flow of the waves into the device 10, thereby increasing both the volume and velocity of the flow through the device. Alternatively, the wave leveler 18 may be attached to the top, anterior ends of the side walls 22c where the top wall 22a is omitted. The wave leveler 18 may be in the form of a straight, curved, or angled plate. Preferably, the wave leveler 18 is angled, such that the wave leveler 18 gradually gets closer to the bottom wall 22b of the body 12 as it gets farther away from the anterior end 26 of the body 12 and the entry to the channel 24. The angle at which the wave leveler 18 extends from the body 12 relative to the top wall 22a may be any angle less than ninety (90) degrees and may be selected according to the size of the waves, or the variation in size of the waves, which the device 10 is intended to capture.

Generally, both the wave leveler 18 and the anterior lateral wave confinement blades 20 are integral to the walls 22 of the body 12 of the shoaling water energy conversion device 10. However, optionally, the wave leveler 18, the anterior lateral wave confinement blades 20, or both, may be in the form of hinged extensions, such that the amount of wave water captured by the device may be adjusted as circumstances require (for example, to prevent damage to the device 10 from larger-than-normal waves from storms) or such that the hinged extensions may be connected to separate turbines or pumps and allowed to flex or rotate relative to the body 12 of the device 10 to produce additional electrical or mechanical energy.

Preferably, the shoaling water energy conversion device 10 includes both the wave leveler 18 and the anterior lateral wave confinement blades 20, but, optionally, either the wave leveler 18, the anterior lateral wave confinement blades 20, or both, may be omitted from the shoaling water energy conversion device 10.

The leading edge 28 of the bottom wall 22b preferably has a pointed or rounded edge in order to more easily penetrate a the surface of a wave as an oncoming wave reaches the shoaling water energy conversion device 10. However, it may alternatively have any shape known in the art.

Figure 3:
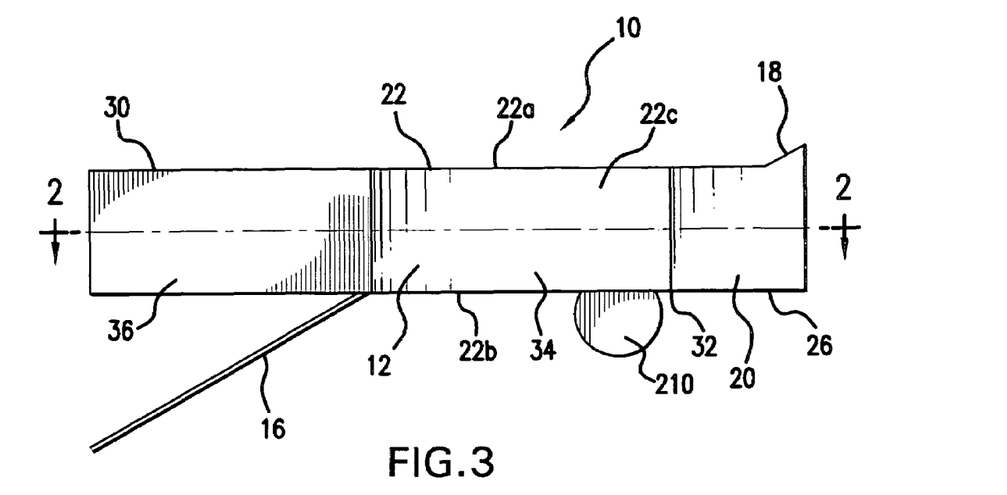
FIG. 3 is an elevational view of the shoaling water energy conversion device of FIG. 1.
Figure 4:
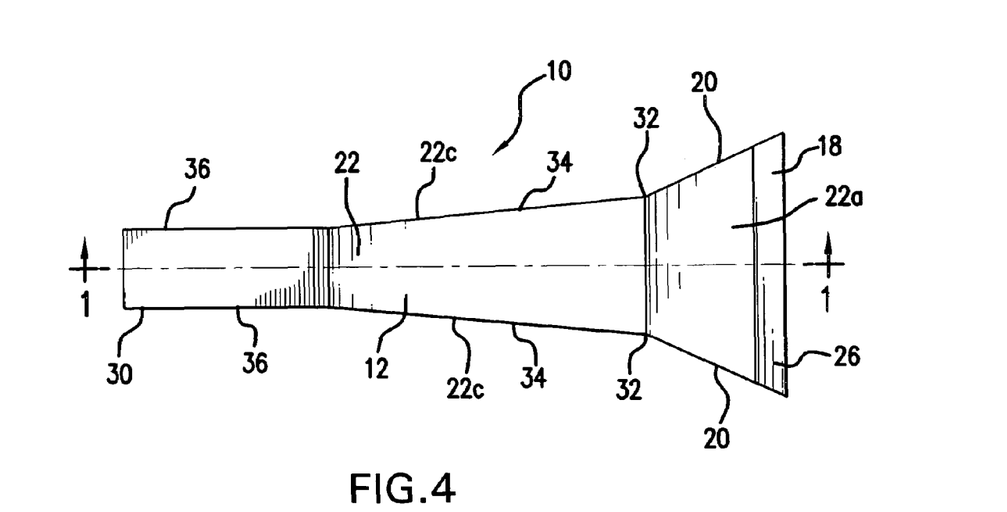
FIG. 4 is plan view of the shoaling water energy conversion device of FIG. 1.

Referring to FIGS. 1 and 3, the shoaling water energy conversion device 10 preferably includes the water foil or clear out channel flange 16, which is located on the underside of the shoaling water energy conversion device 10, near the posterior end 30 of the body 12. The clear out channel flange 16 creates a void area or cleared out channel in the water as waves or flowing water pass by the device, such that the surface of the water in the void area is lower than the surface of the water in surrounding area. As such, the clear out channel flange 16 allows the water that is exiting the device 10 to be deposited into this void area and avoid any back-pressure that would arise if the surface of the water were near the exit. Preferably, the clear out channel flange 16 is located near the exit of the hydro-turbine 14, such that the exit of the hydro-turbine 14 is located directly above the void area created by the clear out channel flange 16. The clear out channel flange 16 is attached to, or alternatively may be integral to, the bottom wall 22b of the body 12 and projects outward therefrom relative to the center axis of the body 12.

Preferably, the clear out channel flange 16 is angled relative to the bottom wall 22b of the body 12, such that the clear out channel flange 16 gradually extends further from the center axis of the body 12 as it becomes closer to the posterior end 30 of the body 12. That is, the clear out channel flange 16 has an angled configuration, such that the clear out channel flange 16 meets the bottom wall 22b of the body 12 at a particular angle. The angle at which the clear out channel flange 16 meets the bottom wall 22b may be any angle less than ninety (90) degrees and may be selected to optimize the combination of the flow of the wave water under the device 10 and the size of the "cleared out" channel or void area in the water. Alternatively, the clear out channel flange 16 may have a curved configuration, as such a design may reduce the friction to which water flowing under the shoaling water energy conversion device 10 is subjected to, allowing the water to flow smoothly under the device 10, thereby reducing the tendency of the posterior end 30 of the body 12 to "lift" as water flows under the device 10.

Figure 5:
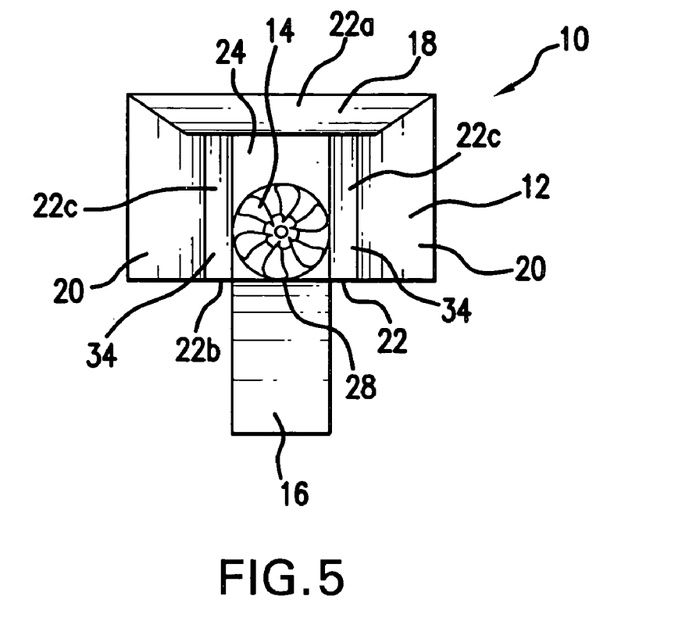
FIG. 5 an elevational view of the shoaling water energy conversion device of FIG. 1 as viewed from the anterior end of the device.
Figure 6:
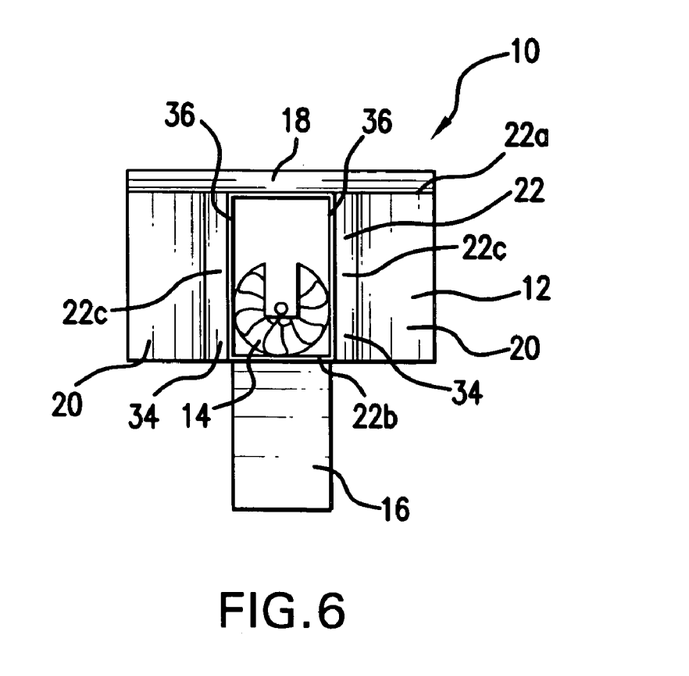
FIG. 6 an elevational view of the shoaling water energy conversion device of FIG. 1 as viewed from the posterior end of the device.

The clear out channel flange 16 may have a variety of general shapes when viewed from the anterior end 26 of the shoaling water energy conversion device 10, including rectangular, semi-elliptical, or rectangular with rounded corners. For example, the clear out channel flange 16 may have a rectangular configuration as shown in FIGS. 5 and 6. Likewise, while it is preferred that the clear out channel flange 16 have a solid configuration, the clear out channel flange may alternatively have a "slotted" configuration.

Generally, only the bottom wall 22b includes the clear out channel flange 16. However, in certain circumstances it may be desireable to include similar clear out channel flanges on one or both of the side walls 22c if such side clear out channel flanges are necessary to create a cleared out channel sufficient to allow wave water free exit from the shoaling water energy conversion device 10.

In ocean or lake water, where the shoaling water energy conversion device 10 is used to capture waves, the device 10 is preferably secured or allowed to be located slightly above the wave troughs, as this allows the water flowing under the device 10 to be properly diverted by the clear out channel flange 16.

While the shoaling water energy conversion device 10 preferably includes the clear out channel flange 16, the clear out channel flange may alternatively be omitted from the device 10. When the clear out channel flange 16 is omitted, the water flowing through the device 10 may exit into a smaller void area created by the body 12 of the device 10 itself. That is, the bottom wall 22b and side walls 22c of the body 12 of the device 10, as well as, in some circumstances, the top wall 22a of the body 12, inherently creates a smaller and shallower void area beneath the exit from the device 10 due to the wake created by the device as water flows passed. While the void area created by the body 12 of the device 10 itself may be smaller than that created by the clear out channel flange 16, in some circumstances it may be sufficient to allow water flowing through the device 10 free exit from the device 10 without interference from the back pressure caused by water adjacent thereto. As such, the device 10 may benefit from the increased efficiency of the device 10 due to the acceleration of water through the device 10 by the movement of the device 10 in waves, even without the inclusion of the clear out channel flange 16.

The hydro-turbine 14 is enclosed within the body 12 of the shoaling water energy conversion device 10 and is located at the posterior end 30 of the body 12, such that the exit of the hydro-turbine 14 is preferably directly above the void area created by the clear out channel flange 16 or, when the clear out channel flange 16 is omitted, into the void area created by the body 12 of the device 10. Preferably, the hydro-turbine 14 is attached to the bottom wall 22b of the body, but alternatively the hydro-turbine 14 may be attached to any one of or a plurality of the walls 22 of the body 12. Optionally, the hydro-turbine 14 may include support structures that hold the hydro-turbine 14 in clearance from the walls 22 of the body 12. Optionally, a plurality of hydro-turbines may be located within a single shoaling water energy conversion device or several shoaling water energy conversion units may be arranged in an array.

Additionally, the hydro-turbine 14 is preferably located a distance from entrance to the shoaling water energy conversion device 10 that is sufficient to allow some of the turbulence in the water caused by the entry of the water into the device 10 to dissipate, thereby increasing the efficiency of the hydro-turbine 14. That is, is the turbulence of the water flowing through the hydro-turbine 14 is too high, the efficiency of the hydro-turbine 14 is reduced because the force of the water on the blades of the hydro-turbine 14 may be reduced. The specific distance which is required for the turbulence of the entering water to dissipate sufficiently varies according to the size, type, speed, and frequency of the waves.

The hydro-turbine 14 may be of any type commonly used in the art that produces electrical energy from the flow of water through the hydro-turbine 14. For example, a Kaplan turbine, an example of which is described and shown in U.S. Pat. No. 6,533,536 to Fisher et al., may be utilized as the hydro-turbine 14. However, any type of hydro-turbine known in the art, such as Pelton, Francis, Kaplan, Wells, impulse, or reaction turbines, may be used in connection with the present invention. Preferably, the hydro-turbine 14 is constructed of corrosion-resistant materials, particularly when the shoaling water energy conversion device 10 is intended for use in salt water. The hydro-turbine 14 may be of a design that operates only as water flows through the device 10 from the anterior end 26 to the posterior end 30 or, preferably, a design that operates either as water flows through the device 10 from the anterior end 26 to the posterior end 30 or from the posterior end 30 to the anterior end 26. In particular, the ability of the hydro-turbine 14 to operate using water flowing in either direction may be important because, under some circumstances, the shoaling water energy conversion device 10 may only partially empty as the anterior end 26 rises and does not completely empty before the anterior end 26 falls into the trough of the next wave. As a result, a portion of the water in the device 10 flows through the hydro-turbine 14 in the opposite direction before water from the next wave crest enters the device 10. Under such circumstances, the shoaling water energy conversion device 10 can produce extra energy due to the ability of the hydro-turbine 14 to operate in water flowing in either direction, thereby further increasing the efficiency of the device 10. However, as discussed herein, the hydro-turbine 14 may have either a "one-way" or "two-way" type of design.

Preferably, the hydro-turbine 14 is of an inexpensive and light-weight design. In particular, the hydro-turbine 14 must be light enough that the buoyancy of the body 12 is sufficient to keep the shoaling water energy conversion device 10 from fully submerging in the water and to allow the shoaling water energy conversion device 10 to rotate relative to the support to which the device 10 is attached as wave pass by and through the device 10.

While the use of a single hydro-turbine 14 is discussed in connection with the present invention, alternatively, a plurality of hydro-turbines may be used in connection with the present invention, either in a "side-by-side" or series configuration. The use of a plurality of hydro-turbines in connection with the present invention may be utilized to increase the electrical generation capability of the shoaling water energy conversion device. Where a plurality of hydro-turbines are utilized with the present invention, the body of the shoaling water energy conversion device may be resized or redesigned to accommodate the additional hydro-turbine(s) while maintaining the functionality of the device. Likewise, where an array of shoaling water energy conversion units is utilized, the units may be located in a common area, which each unit including a single hydro-turbine or a plurality of hydro-turbines and/or hydro-compression units.

When a single shoaling water energy conversion device 10 or an array of shoaling water energy conversion devices are utilized, the device(s) may effectively function as a breakwater. That is, the water that is confined to and flows through the device(s) exhibits a loss of energy upon exit from the device and this exit water, along with the normal functioning of the clear out channel flange 16, will slow down or remove energy from a significant volume of water approaching the beach area, which would normally shoal on or near the beach. Therefore, the device(s) may reduce sand and shore soil dissolution and subsequent erosion of the beach and shoreline.

Figure 7A:
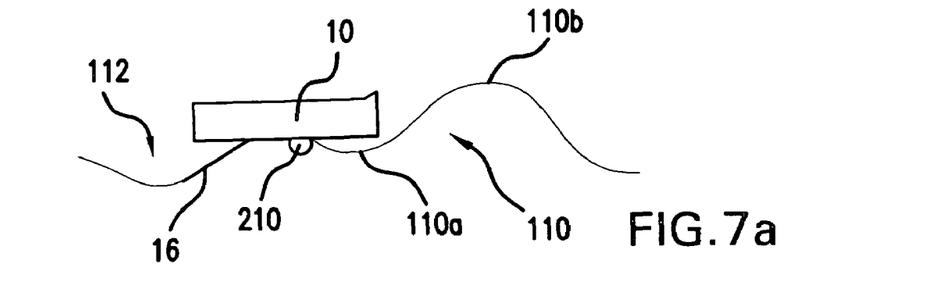
FIGS. 7*a-d* are a series of elevational views of the shoaling water energy conversion device of FIG. 1 showing the basic operation of the device.

Referring to FIGS. 7a-7d, the basic operation of the shoaling water energy conversion device 10 is shown. As seen in FIG. 7a, the shoaling water energy conversion device 10 begins in a substantially horizontal position. As an incoming wave 110, having a trough 110a and a crest 110b, encounters the anterior end 26 of the device 10, the leading edge 28 of the bottom wall 22b of the body 12 penetrates the wave 110 above the trough 110a of the wave 110, such that a significant portion of the wave 110 breaks and overtops the bottom wall 22b of the body 12 and enters the shoaling water energy conversion device 10. The presence of the clear out channel flange 16 creates a cleared-out channel or void area 112 in the water below the exit of the device 10.

Figure 7B:
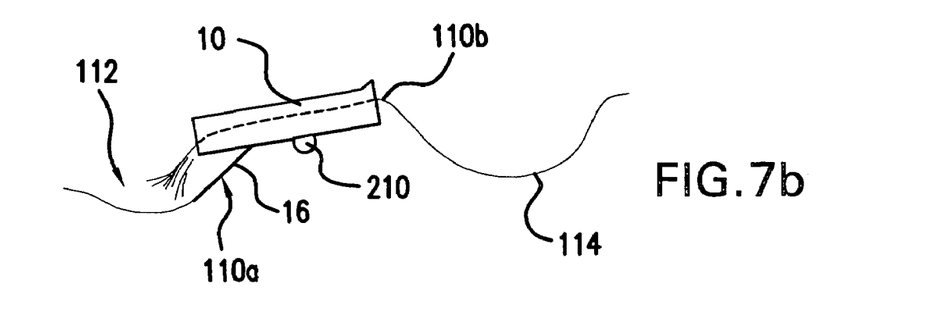

As the crest 110b of the wave 110 begins to pass by the shoaling water energy conversion device 10, as shown in FIG. 7b, a significant portion of the approaching wave 110 enters or is "scooped up" into the anterior end 26 of the device 10, after which the additional weight of the ingested water flowing through the device 10 causes the posterior end 30 of the device 10, which is now approaching the trough 110a of the wave 110, to tip downward. As such, the anterior end 26 of the device 10 is higher than the posterior end 30 of the device 10, due to the weight of the water within the shoaling water energy conversion device 10 and, in part, to the elevation of the anterior end 26 of the device 10 by the residual segment of the ingested wave 110, which accelerates the flow of water through the device 10. As the water flows through the shoaling water energy conversion device 10 the flowing water causes the hydro-turbine 14 to operate, thereby producing electrical energy. When the water flowing through the shoaling water energy conversion device 10 exits the device 10, it is deposited in the void area 112 created by the clear out channel flange 16.

Figure 7C:
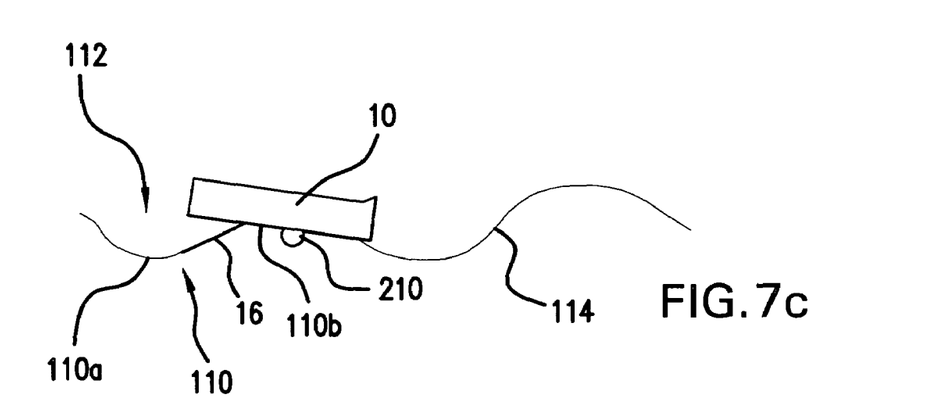

As the crest 110b of the wave 110 continues to pass by the shoaling water energy conversion device 10, as shown in FIG. 7c, and after substantially all of the water flowing through the device 10 has exited therefrom, the combination of the crest 110a of the wave 110 and the lack of the additional weight of the water flowing through the device 10 causes the posterior end 30 device to tip upward. Conversely, the anterior end 26 of the device 10 is beginning to enter a trough 114 of the following wave and therefore tips downward. As such, the posterior end 30 of the device 10 is higher than the anterior end 26 of the device 10, which allows the anterior end 26 of the device 10 to return to the proper position to penetrate the next incoming wave.

Figure 7D:
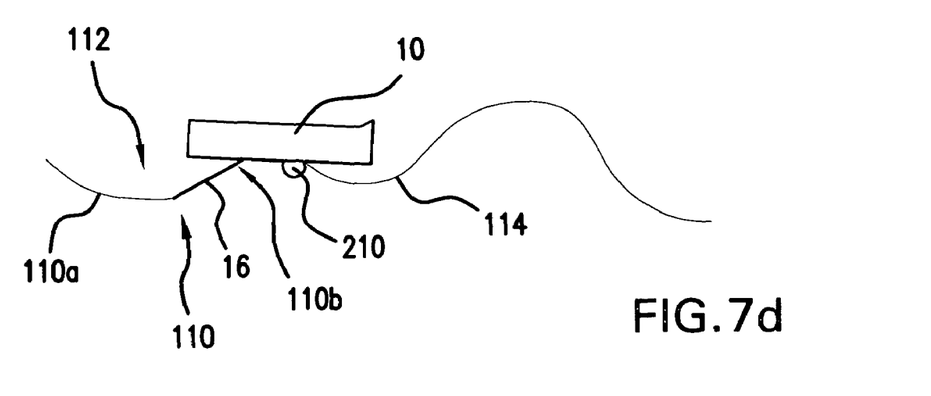

Finally, as seen in FIG. 7d, as the crest 110b of the wave 110 passes completely by the shoaling water energy conversion device 10, the device 10 returns to its substantially horizontal position and is in the proper position to penetrate the next incoming wave.

While FIGS. 7a-7d show the basic operation of the shoaling water energy conversion device 10 that includes the clear out channel flange 16, the operation remains basically the same when the clear out channel flange 16 is omitted therefrom. The only differences are that the void area 112 is smaller and shallower under such circumstances and the void are 112 is created by the water flowing by and around the body 12 of the device 10, rather than by the clear out channel flange 16. A device 10 that does not include the clear out channel flange 16 will still exhibit the acceleration of the flow of water through the device 10 caused by the lifting of the anterior end 26 of the device 10 by the crest 110b of the wave 110 and the drop of the posterior end 30 of the device 10 caused by the additional weight of the water and the approach of trough 110a of the wave 110 toward the posterior end 30 of the device 10. As such, the shoaling water energy conversion device 10 may exhibit improved efficiency due to this motion, even when the clear out channel flange 16 is omitted.

While FIGS. 7a-7d show the basic operation of the shoaling water energy conversion device 10 with water waves, the device 10 operates in much the same way in flowing water, such as that found in rivers in streams. However, since in such bodies of water the water is already flowing and waves are generally much smaller, the flow of the water itself forces the water capture by the shoaling water energy conversion device 10 to flow therethrough, thereby causing the hydro-turbine 14 to operate and produce electrical energy. In generally, the device 10 exhibits less of a "tip up, tip down" movement in such bodies of water due to the lack of significant waves and constant flow of water. However, the clear out channel flange 16 (or the body 12 of the device 12 where the clear out channel flange 16 is omitted) still creates a void area into which the water exiting the device 10 is deposited.

The mechanical or electrical energy produced by the water shoaling energy conversion device 10 may be transmitted to ship, shore, or any other location in any way known in the art and may utilize any components known in the art for such transmission. Generally, the energy will be transmitted via wires or cables to the destination. However, the mechanical or electrical energy generated by the water shoaling energy conversion device 10 may also be utilized on-site, such that transmission components or equipment is unnecessary. The hardware and components necessary for the transmission of electrical energy to such locations may be attached to the shoaling water energy conversion device 10 in any way known in the art.

The shoaling water energy conversion device 10 may be supported by any number of different support apparatuses either alone or in additional to floats that are integral to or attached to the device 10. For example, the device 10 may be support by its own integral self-contained float 210, as shown in FIG. 1. When such a float 210 is used, the float 210 must have sufficient buoyancy to correctly position the leading edge 28 of the bottom wall 22b to penetrate incoming waves and must be positioned such that the device 10 exhibits the desired "tip up, tip down" movement as water passes through the device 10, which will generally vary according to the size, type, and frequency of the waves with which the device is to be used. Preferably, where such a float 210 is used, the float 210 is adjustable relative to the location of the hydro-turbine 14 and the anterior end 26 of the body 12 of the shoaling water energy conversion device 10, such that its location along the bottom wall 22b of the body may be adjusted according to the size and speed of waves or the type of body of water in which the device 10 will be used. Alternatively, where there is little variation in the size, type, and frequency of the waves with which the shoaling water energy conversion device 10 will be used, the float 210 may be permanently affixed to one position on the body 12. Generally, when the float 210 is used to support the shoaling water energy conversion device 10, the device 10 is held in the proper position using any method known in the art, such as a cable and anchor weight.

Alternatively, in place of the float 210, the shoaling water energy conversion device 10 may include a support apparatus that includes ballast tanks or floats that are attached to the support apparatus rather than the shoaling water energy conversion device 10 itself. In most cases, such a support apparatus will be made of light-weight materials in order to reduce the buoyancy needed to keep the support apparatus and the shoaling water energy conversion device 10 afloat.

Figure 8:
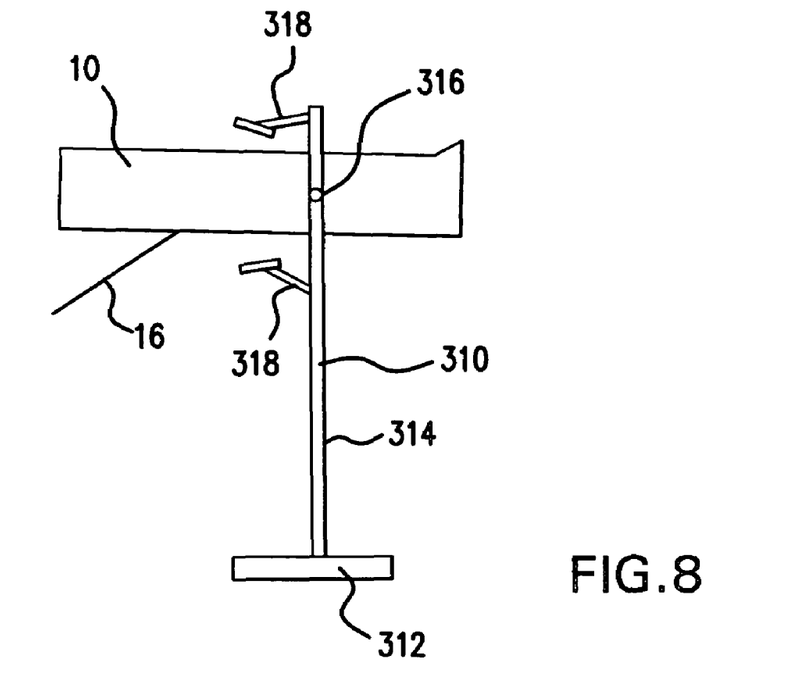
FIG. 8 is an elevational view of the shoaling water energy conversion device of FIG. 1 showing an alternative support apparatus for supporting the device in the form of a support framework.
Figure 9:
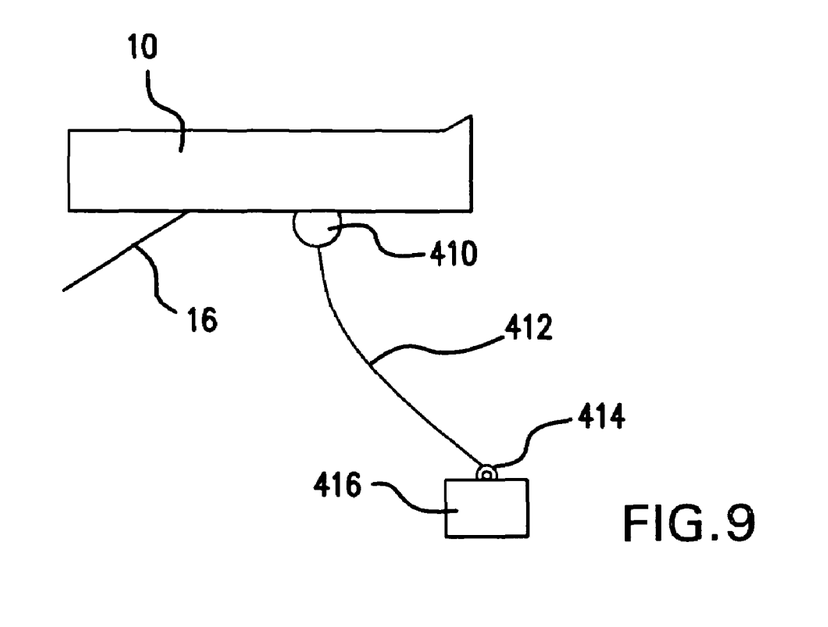
FIG. 9 is an elevational view of the shoaling water energy conversion device of FIG. 1 showing an alternative support apparatus for supporting the device in the form of a tethered anchor.

The shoaling water energy conversion device 10 may alternatively be supported by a support framework, as may be seen in FIG. 8, or tethered to a cable, rope, or other mechanism in the path of incoming waves or in a water current, such as would exist in flowing rivers or streams, as shown in FIG. 9. Finally, the shoaling water energy conversion device 10 may be supported by a support framework attached to an overhead structure, as may be seen in FIG. 10. In particular, the shoaling water energy conversion device 10 may be supported by a support apparatus extending from an oil rig or other similar ocean-going platform or vessel.

Preferably, whichever support apparatus is utilized allows the shoaling water energy conversion device 10 to be located slightly above the wave troughs, as this allows the water flowing under the device 10 to be sufficiently diverted by the clear out channel flange 16.

For example, as shown in FIG. 8, the shoaling water energy conversion device 10 may be supported by a support framework 310 anchored to the sea, river or steam bed. The framework 310 includes a base 312, a vertical support 314, and at least one attachment point 316.

The base 312 of the support framework 310 is anchored to the sea, river or steam bed in any way known in the art. For example, the base 312 may be attached to a concrete footing, heavy anchor, or other similar structure, or the base 312 itself may be provided with sufficient weight to keep the support framework 310 upright and in place. Preferably, the base 312, or the structure to which the base 312 is attached, is sufficient to keep the support framework 310 substantially upright and to keep the framework 310 from moving relative to the sea, river or steam bed once the shoaling water energy conversion device 10 has been attached. In particular, the weight of the base 312 or the structure to which it is attached must be sufficient to substantially keep the shoaling water energy conversion device 10 from being shifted out of position by incoming waves. The attachment may incorporate tethered pivots such that the device may freely pivot or change direction in order to properly meet incoming waves.

The vertical support 314 of the support framework 310 extends from the base 312 upward to the surface of the water. The specific length of the vertical support 314 may be selected according to the height at which the user desires the shoaling water energy conversion device 10 to be located. Generally, the vertical support 314 extends a short distance above the surface of the water. Although a fixed vertical support 314 is discussed herein, it will be recognized by those skilled in the art that an adjustable vertical support may alternatively be used, such that the position of the shoaling water energy conversion device 10 relative to the surface of the water may be adjusted as necessary.

Optionally, additional structures may be attached to the above-water portion of the vertical support 314 of the support framework 310. For example, in some circumstances, it may be desirable to include a platform on which maintenance personnel may stand while conducting maintenance on the shoaling water energy conversion device 10 or other equipment or to include lights, signs, buoys, or other equipment or navigational aids to help boats and ships to avoid the shoaling water energy conversion device 10 and the support framework 310 or to provide information to personnel located off-site.

While the use of a single vertical support 314 is discussed herein, it will be clear to one skilled in that are that a plurality of vertical supports may be used in connection with the present invention without departing from the scope thereof.

The vertical support 314 includes at least one attachment point 316 at which the shoaling water energy conversion device 10 is attached to the support framework 310. The specific type of attachment point used may be any kind generally used in the art, but preferably the attachment point 316 includes a bearing that allows the body 12 of the shoaling water energy conversion device 10 to rotate relative to the support framework 310 as wave pass the device 10.

Optionally, the vertical support 314 of the support framework 310 may include one or more vertical stops 318. The vertical stops 318 may be used to limit the rotation of the shoaling water energy conversion device 10 relative to the support framework 310, such that the range of motion of the shoaling water energy conversion device 10 is limited to a particular range of angles off horizontal. That is, the vertical stops 318 may be used to set the minimum height of the posterior end 30 of the shoaling water energy conversion device 10 as wave troughs pass the device 10 and the maximum height of the posterior end 30 as wave crests pass the device 10. As such, the rotation of the shoaling water energy conversion device 10 may be limited to the range in which it operates most efficiently. Preferably, the vertical stops 318 include pads or other similar components that prevent damage to the shoaling water energy conversion device 10 when the device 10 impacts the vertical stops 318.

When a tethered to a cable, rope, or other mechanism in the path of incoming waves or in a water current as shown in FIG. 9, the shoaling water energy conversion device 10 includes a tether attachment point 410. The tether attachment point 410 is generally located on the underside of the bottom wall 22b of the body 12 of the device 10, but alternatively one or more attachment points may be located on one or more of the side walls 22c of the body 12. A tether or cable 412 attaches to the shoaling water energy conversion device 10 at the attachment point 410 and to an anchor attachment point 414 on an anchor 416. The cable or tether 412 may be in the form of any tether or cable known in the art, such as a nylon or multi-strand cable. Preferably, the cable or tether 412 is constructed of a high-strength material the resists corrosion. Likewise, the anchor 416 may be of any type of anchor generally known in the art, such as concrete footing, heavy anchor, sunken barge, or other similar structure. The anchor 416 rests on the floor of the body of water in which the shoaling water energy conversion device 10 is located and has sufficient weight to hold the device 10 substantially in position relative to incoming waves or flowing water.

Figure 10:
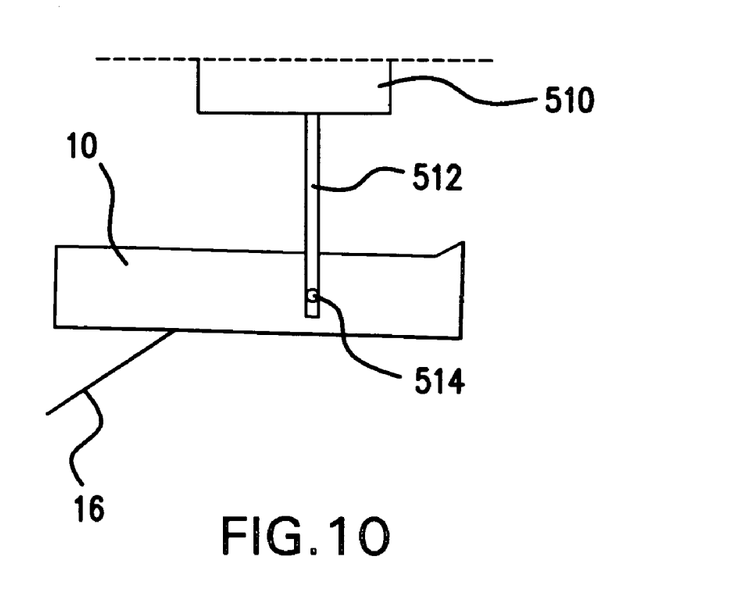
FIG. 10 is an elevational view of the shoaling water energy conversion device of FIG. 1 showing an alternative support apparatus for supporting the device in the form of an overhead support.

As best seen in FIG. 10, when the shoaling water energy conversion device 10 is supported by an overhead structure 510, such as an oil platform, there generally is a vertical support 512 that is attached to or integral to the overhead structure 510. The specific length of the vertical support 512 may be selected according to the height at which the user desires the shoaling water energy conversion device 10 to be located. Generally, the vertical support 512 holds the shoaling water energy conversion device 10 such that the bottom wall 22b of the device 10 penetrates an incoming wave above the trough of the wave, such that a significant portion of the wave breaks and overtops the bottom wall 22b of the body 12 and flows through the shoaling water energy conversion device 10. The vertical support 512 includes at least one attachment point 514 at which the shoaling water energy conversion device 10 is attached to the vertical support 512. The specific type of attachment point used may be any kind generally used in the art, but preferably the attachment point 514 includes a bearing that allows the body 12 of the shoaling water energy conversion device 10 to rotate relative to the vertical support 512 as wave pass the device 10.

While the use of a single vertical support 512 is discussed herein, it will be clear to one skilled in that are that a plurality of vertical supports may be used in connection with the present invention without departing from the scope thereof. Likewise, although a fixed vertical support 512 is discussed herein, it will be recognized by those skilled in the art that an adjustable vertical support may alternatively be used, such that the position of the shoaling water energy conversion device 10 relative to the surface of the water may be adjusted as necessary. Additionally, the vertical support 512 may also alternatively include vertical stops similar to those discussed above in connection with the support framework 310.

While the invention has been described in the specification primarily as being for use in producing electrical energy, it should be clear to one skilled in the art that the present invention may also be used to produce mechanical energy, such as through the production of compressed water or fluid through the use of hydro-compression units, either in place of producing electrical energy or, more preferably, in addition to producing electrical energy. As such, when the use of the present invention in connection with the production of electrical energy is discussed herein, it should be recognized that the present invention may also produce mechanical energy. In particular, the present invention may be used to transfer water or fluid under pressure from the shoaling water energy conversion device 10 to a ship or to shore.

Figure 11:
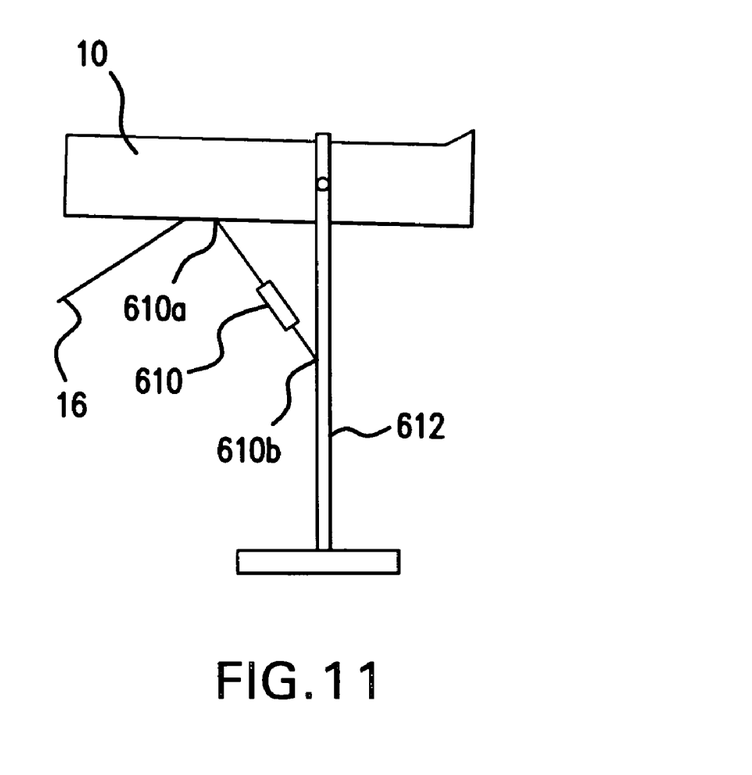
FIG. 11 is an elevational view of the shoaling water energy conversion device of FIG. 1 showing an alternative configuration for producing mechanical energy to transfer water or fluid under pressure.

As may be seen in FIG. 11, where the shoaling water energy conversion device 10 will be used to product mechanical energy to transfer water or fluid under pressure, the device 10 includes a reciprocating hydro-pump 610 attached to the bottom wall 22b of the body 12 of the device 10. One end 610a of the pump 610 is attached to the underside of the bottom wall 22b of the body 12 and the opposite end 610b of the pump 610 is attached to the support apparatus 612 which is holding the shoaling water energy conversion device 10. Alternatively, the opposite end 610b of the pump 610 may be attached to a pump anchor on the floor of the body of water in which the device is located.

The pump 610 is activated and operated by the regular movement of the shoaling water energy conversion device 10. That is, as water flows through the device 10, the weight of the water and/or the passing of a trough of a wave causes the posterior end 30 of the device 10 to tip downward, compressing the pump 610. After the water has passed through the device 10 and a wave crest passes, the posterior end 30 of the device 10 is forced upward, thereby extending the pump 610 back to its starting position. As such, the normal "tip up, tip-down" movement of the shoaling water energy conversion device 10 causes the pump 610 to operate at regular intervals, thereby pumping water or fluid.

While the use of a reciprocating pump is discussed herein, any pump generally known in the art may be used in place of the reciprocating pump without departing from the scope of the present invention. Likewise, while the pump 610 is discussed as being attached to the underside of the bottom wall 22b of the body 12 of the device 10, the pump may alternatively be attached to the top surface of the top wall of the body where the device is being supported from an overhead structure, rather than an anchored support apparatus, without departing form the scope of the present invention. Additionally, while the shoaling water energy conversion device 10 with the pump 610 is shows as being utilized with one example of a support apparatus 612, any other form of a support apparatus discussed herein or known in the art which allows the pump 610 to operate during the normal use of the device 10 may alternatively be utilized.

Alternatively, the optional hydro-pump may be replaced with an electrical generating unit for producing additional electrical energy, rather than being used to produce mechanical energy to transfer water or fluid.

While the invention has been described in the specification primarily as being for use with water waves, it should be clear to one skilled in the art that the present invention may also be used in flowing water, such as flowing streams or rivers, even if no waves are present. As such, when the use of the present invention in connection with waves is discussed herein, it should be recognized the flowing water may be utilized in place of, or in addition to, said waves. Therefore, it is intended that the present invention not be limited to the use of the shoaling water energy conversion device with wave, but that the present invention may also be used with any form of flowing or moving water.

While the invention has been described in the specification and illustrated in the drawings with reference to certain preferred embodiments, it will be understood by those skilled in the art that various changes may be made and equivalents may be substituted for elements thereof without departing from the scope of the present invention as defined in the appended claims. In addition, many modifications may be made to adapt a particular situation or material to the teachings of the invention, as defined in the appended claims, without departing from the essential scope thereof. Therefore, it is intended that the present invention not be limited to the particular embodiments illustrated by the drawings and described in the specification as the best modes presently contemplated for carrying out the present invention, but that the present invention will include any embodiments falling within the description of the appended claims.

What is claimed is:

1. A water energy conversion apparatus comprising:
an anchor adapted to be disposed on the bottom of a body of water;
a tether connected to the anchor;
a body portion defining at least one channel and including an anterior end, a posterior end and a bottom wall, the body portion being connected to the tether at the bottom wall between the anterior and posterior ends, the body portion having at least one float adapted to support the body portion on the surface of the body of water, and wherein the weight of water that enters and flows through the channel causes the posterior end of the body portion to move to a position that is lower than the anterior end of the apparatus, and wherein as water flows through the apparatus the posterior end is located in or approaching a trough of a wave while the anterior end of the apparatus is being lifted by a crest of a wave, such that the body portion temporarily exhibits an angled configuration that accelerates the water as it flows through the channel, the angled configuration being provided by the up and down movement of the anterior and posterior ends about the connection of the tether;
at least one hydro-turbine; and
at least one clear out channel flange located on the underside of the body at the posterior end thereof, wherein the at least one clear out channel flange creates at least one void area in water surrounding the apparatus;
wherein the at least one channel directs water that enters the apparatus through the at least one hydro-turbine and wherein the water exiting the apparatus is deposited into the at least one void area.

2. The water energy conversion apparatus of claim 1 wherein the body portion has an angled configuration such that the channel has a larger cross-section at the entrance to the apparatus and a smaller cross-section at the hydro-turbine.

3. The water energy conversion apparatus of claim 1 wherein the body includes an upper portion and at least one catch plate that extends from the upper portion of the body, wherein the at least one catch plate directs water into the channel.

4. The water energy conversion apparatus of claim 1 wherein the body includes at least one confinement blade that extends outward at an angle to the body, wherein the at least one confinement blade directs water into the channel.

5. The water energy conversion apparatus of claim 4 wherein the body includes at least one side portion and the at least one confinement blade extends from the at least one side portion of the body.

6. The water energy conversion apparatus of claim 1 wherein the at least one hydro-turbine comprises a plurality of hydro-turbines.

7. The water energy conversion apparatus of claim 1 wherein the at least one hydro-turbine comprises a plurality of hydro-turbines and the body portion includes a plurality of channels, wherein each of the plurality of channels includes a hydro-turbine.

8. The water energy conversion apparatus of claim 7 where the at least one clear out channel flange comprises a plurality of clear out channel flanges, wherein each of the plurality of channels corresponds with a clear out channel flange.

9. The water energy conversion apparatus of claim 1 further comprising at least one ballast tank.

10. The water energy conversion apparatus of claim 9 wherein the at least one ballast tank is integral to the body.

11. The water energy conversion apparatus of claim 9 wherein the buoyancy of the at least one ballast tank can be adjusted, such that the distance which the water energy conversion apparatus extends above the surface of the body of water in which the water energy conversion apparatus is located may be adjusted.

12. The water energy conversion apparatus of claim 11 further comprising a computer wherein the computer is programmed to adjust the buoyancy of the at least one ballast tank.

13. The water energy conversion apparatus of claim 1 wherein the at least one float is attached to the body portion and the position of the at least one float on the body portion may be adjusted.

14. The water energy conversion apparatus of claim 1 wherein the at least one float is integral to the body.

15. The water energy conversion apparatus of claim 1 wherein the buoyancy of the at least one float may be adjusted, such that the distance which the water energy conversion apparatus extends above the surface of the body of water in which the water energy conversion apparatus is located may be adjusted.

16. The water energy conversion apparatus of claim 1 further comprising a means to transfer electrical energy from the apparatus to another location.

17. The water energy conversion apparatus of claim 1 further comprising a pump and an outlet tube or pipe for transferring fluid from the apparatus to another location.

18. The water energy conversion apparatus of claim 17 wherein the pump is a reciprocating pump.

19. The water energy conversion apparatus of claim 18 further comprising a support for supporting the water energy conversion apparatus, wherein the body portion includes a bottom wall, and wherein a first end of the pump is attached to the bottom wall of the body and a second end of the pump is attached to the support.

* * * * *